(12) United States Patent
Bartolomé Rodrigo et al.

(10) Patent No.: US 11,832,169 B2
(45) Date of Patent: Nov. 28, 2023

(54) SERVICE REGISTRATION AND DISCOVERY IN A COMMUNICATIONS NETWORK

(71) Applicant: Telefonaktiebolaget LM Ericsson (publ), Stockholm (SE)

(72) Inventors: Maria Cruz Bartolomé Rodrigo, Madrid (ES); Emiliano Merino Vazquez, Madrid (ES)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/407,582

(22) Filed: Aug. 20, 2021

(65) Prior Publication Data
US 2021/0385737 A1 Dec. 9, 2021

Related U.S. Application Data (63) Continuation of application No. 16/756,102, filed as application No. PCT/EP2018/078045 on Oct. 15, 2018, now Pat. No. 11,109,307.

(51) Int. Cl.
*H04W 48/16* (2009.01)
*H04W 4/50* (2018.01)

(52) U.S. Cl.
CPC ............ *H04W 48/16* (2013.01); *H04W 4/50* (2018.02)

(58) Field of Classification Search
CPC .......... H04N 5/23277; H04N 5/23245; H04N 5/23267; H04N 5/2329; H04N 5/23258; G03B 5/00; G03B 15/00

USPC ........................................................ 455/434
See application file for complete search history.

(56) References Cited

U.S. PATENT DOCUMENTS

| | | | |
|---|---|---|---|
| 2005/0102703 A1 | 5/2005 | Querashi et al. | |
| 2015/0065086 A1 | 3/2015 | Linkola et al. | |
| 2016/0134599 A1 | 5/2016 | Ross et al. | |
| 2016/0381657 A1 | 12/2016 | Blanchard et al. | |
| 2018/0139797 A1 | 5/2018 | Chun et al. | |

FOREIGN PATENT DOCUMENTS

| | | |
|---|---|---|
| RU | 2273097 C2 | 3/2006 |
| WO | 2017142362 A1 | 8/2017 |

OTHER PUBLICATIONS

650 Route des Lucioles—Sophia Antipolis 3rd Generation Partnership Project; Technical Specification Group Core Network and Terminals; 5G System—Phase 1; CT WG4 Aspects (Year: 2017).*

(Continued)

*Primary Examiner* — Tanmay K Shah
(74) *Attorney, Agent, or Firm* — Christopher & Weisberg, P.A.

(57) ABSTRACT

Embodiments disclosed herein include a method for service registration in a communications network. The method comprises receiving a service registration request, the request identifying a network function to provide a service, a type of the service, and data administered by the service provided by the network function; and storing information in a repository, the information identifying the network function, the type of the service and the data administered by the service provided by the network function.

18 Claims, 7 Drawing Sheets

(56) References Cited

OTHER PUBLICATIONS

International Search Report and Written Opinion dated Dec. 17, 2018 for International Application No. PCT/EP2018/078045 filed on Oct. 15, 2018, consisting of 12-pages.
International Preliminary Report on Patentability dated Dec. 12, 2019 for International Application No. PCT/EP2018/078045 filed on Oct. 15, 2018, consisting of 22-pages.
3GPP TR 29.891 V1.0.0; 3rd Generation Partnership Project; Technical Specification Group Core Network and Terminals; 5G System—Phase 1; Ct WG4 Aspects (Release 15); Sep. 2017, consisting of 132-pages.
3GPP TS 23.501 V1.4.0; 3rd Generation Partnership Project; Technical Specification Group Services and System Aspects; System Architecture for the 5G System; Stage 2 (Release 15); Sep. 2017, consisting of 152-pages.
3GPP TS 23.501 V15.3.0; 3rd Generation Partnership Project; Technical Specification Group Services and System Aspects;System Architecture for the 5G System;Stage 2 (Release 15); Sep. 2018, consisting of 226-pages.
3GPP TS 23.502 V15.3.0; 3rd Generation Partnership Project; Technical Specification Group Services and System Aspects; Procedures for the 5G System; Stage 2 (Release 15); Sep. 2018, consisting of 330-pages.
3Gpp TR 23.742 V1.0.0; 3rd Generation Partnership Project; Technical Specification Group Services and System Aspects; Study on Enhancements to the Service-Based Architecture (Release 16); Sep. 2018, consisting of 101- pages.
Russian Office Action, Search Report and English Translation dated Jul. 7, 2020 for International Application No. 2020115815 filed on Oct. 15, 2018, consisting of 19-pages.

* cited by examiner

SERVICE REGISTRATION AND DISCOVERY IN A COMMUNICATIONS NETWORK

CROSS-REFERENCE TO RELATED APPLICATIONS

This application is a Continuation of U.S. application Ser. No. 16/756,102, filed Apr. 14, 2020, which is a Submission Under 35 U.S.C. § 371 for U.S. National Stage Patent Application of International Application No.: PCT/EP2018/078045, filed Oct. 15, 2018, entitled "SERVICE REGISTRATION AND DISCOVERY IN A COMMUNICATIONS NETWORK."

FIELD

At least some examples of the present disclosure relate to the technical field of methods and apparatus for service registration and/or discovery in a communications network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The 5th Generation ("5G") System is being developed, documented in references [1] and [2], the contents of which are incorporated herein by reference. The 5G System takes the form of a SBA (Service Based Architecture) including a plurality of Network Functions, where each Network Function (NF) provides one or multiple services (as a producer NF) to one or multiple service consumers (each being a consumer NF). For example, a HTTP/REST (Representational State Transfer using HTTP) Application Programming Interface (API) can be used for interaction between producer services and consumer services. In some cases, a NF may include one or more consumer services and one or more producer services.

Figure 1:
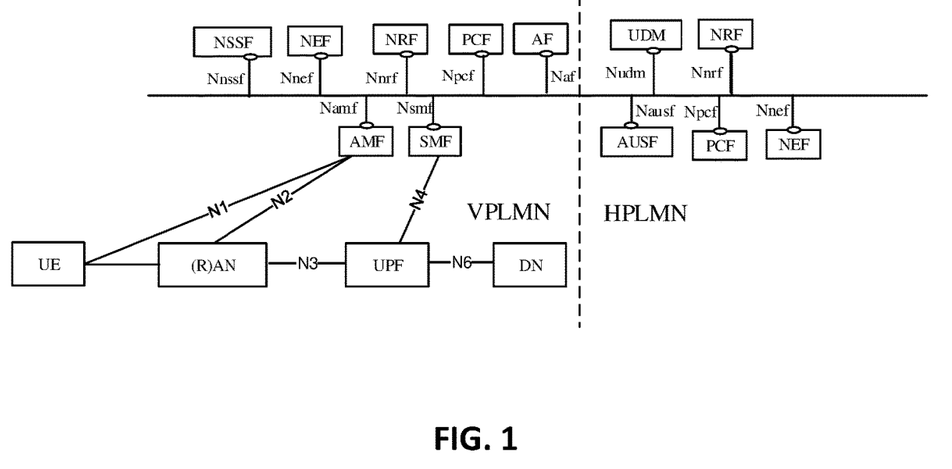
FIG. 1 is a schematic illustration of an example of a roaming 5G system architecture.

FIG. 1 shows an example of a roaming 5G system architecture. In the service based architecture of a 5G system, it is intended that a service provided by a service producer is used (e.g. consumed) by a service consumer. The number of services (or service instances) available in a 5G system is dynamic (due to, for example, scaling up or down, failures, programmed maintenance and/or other factors). The 5G system therefore envisages a Network Repository Function (NRF) that supports functionality including the following:

NF service registration and deregistration in the NRF;
discovery of NF services by a NF service consumer; and
authorization of NF service consumer access to a producer.

Figure 2:
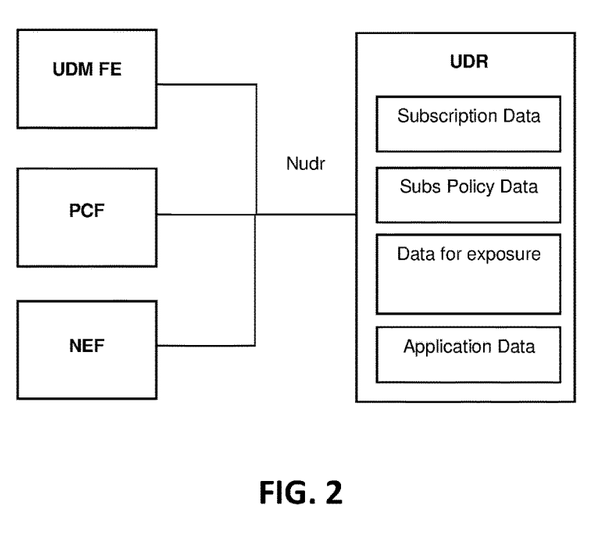
FIG. 2 is a schematic illustration of an example of UDR contents and consumer network functions.

In a 5G architecture such as that shown in FIG. 1, a Unified Data Management (UDM) network function may store subscriber data in a database. In a layered architecture, UDM consists of a UDM Front End (UDM-FE) plus a database. FIG. 2 shows an example of UDR contents and consumer services (e.g. in one or more network functions). As shown, the UDR contains subscription data, subscription policy data, data for exposure and application data, and interfaces via a Nudr interface with UDM-FE, PCF and NEF network functions. The structure shown in FIG. 2 is merely an example and the entities depicted may be organised in a different manner and/or use different interface(s).

The Nudr interface is defined for network functions, such as UDM FE, PCF and NEF, to access a particular view of the data stored and to read, update (including add, modify), and delete data, and to subscribe to notification of changes of relevant data from the UDR. Each Network Function accessing the UDR may be able to add, modify, update or delete only the data it is authorised to change. This authorisation may be performed on a per view and per NF consumer basis and potentially on a per UE, subscription and/or roaming agreement basis by the UDR.

Table 1 below shows an example of services defined for UDM, and related service operations.

TABLE 1

| NF service | Service Operations | Operation Semantics | Example Consumer(s) |
|---|---|---|---|
| Subscriber Data Management | Get | Request/Response | AMF, SMF, SMSF |
| | UpdateSubscribe Request | Subscribe/Notify | AMF, SMF, SMSF |
| | UpdateUnsubscribe | Subscribe/Notify | AMF, SMF, SMSF |
| | UpdateNotification | Subscribe/Notify | AMF, SMF, SMSF |
| UE context management | Registration | Request/Response | AMF, SMF, SMSF |
| | RemoveNotification | Subscribe/Notify | AMF, SMF, SMSF |
| | Deregistration | Request/Response | AMF, SMF, SMSF |
| | Get | Request/Response | NEF |
| | Update | Request/Response | AMF |
| UE Authentication | Request | Request/Response | AUSF |
| EventExposure | Subscribe | Subscribe/Notify | NEF |
| | Unsubscribe | | NEF |
| | Notify | | NEF |

For UDR only one service is defined with related service operations as shown below in Table 2.

TABLE 2

| NF service | Service Operations | Operation Semantics | Example Consumer(s) |
|---|---|---|---|
| Unified Data Management | query | Request/Response | UDM FE, PCF, Provisioning FE, NEF |
| | create | Request/Response | Provisioning FE, NEF |
| | delete | Request/Response | Provisioning FE, NEF |

TABLE 2-continued

| NF service | Service Operations | Operation Semantics | Example Consumer(s) |
|---|---|---|---|
|  | update | Request/Response | Provisioning FE, UDM, FE, PCF, NEF |
|  | subscribe | Subscribe/Notify | UDM FE, PCF |
|  | notify |  | UDM FE, PCF |

NOTE 1:
Whether the data model used by UDR services is standardized or not leaves to stage 3 for decision.

NOTE 2:
As defined in TS 23.335 [11] clause 4.2.2, A Provisioning Front End is an Application Front End for the purpose of provisioning the UDR for subscription data and/or policy data.

Figure 3:
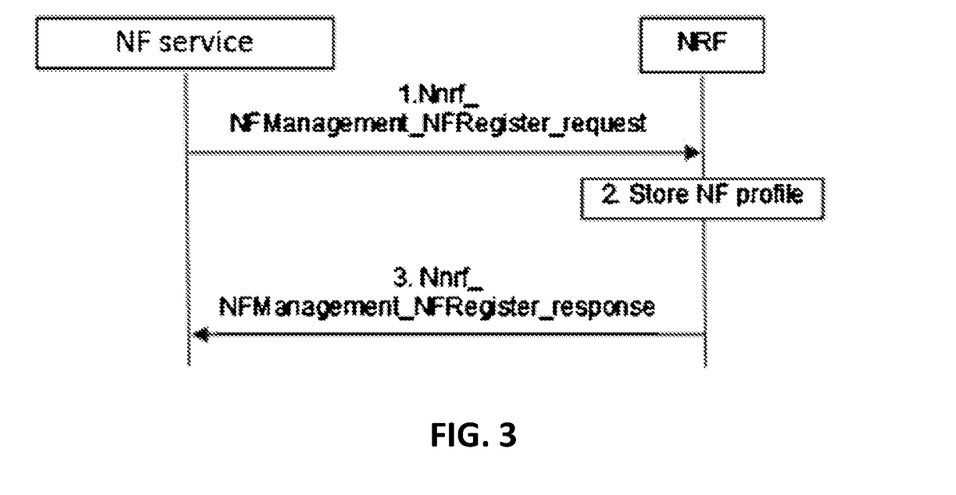
FIG. 3 is an illustration of an example of communications between a NF and NRF for registration of a NF service.

FIG. 3 shows an example of communications between a NF (e.g. NF service, NF service producer) and NRF for registration of a service (e.g. service in a NF, or NF service). In Step 1, the NF service (service producer) sends a service profile (e.g. NF service profile) to the NRF. In step 2, the NRF stores the NF service profile. In Step 3, the NRF sends an acknowledgement as a response to the NF (service producer). The terms "NF service" and "NF service profile" may be interchanged with "service" and "service profile".

A NF service profile may include the following information:
NF instance ID
NF type
PLMN ID
Network Slice related Identifier(s) e.g. S-NSSAI, NSI ID
FQDN or IP address of NF
NF capacity information
NF Specific Service authorization information
Names of supported services
Endpoint information of instance(s) of each supported service
Other service parameter(s), e.g., DNN, notification endpoint for each type of notification that the NF service is interested in receiving.

Figure 4:
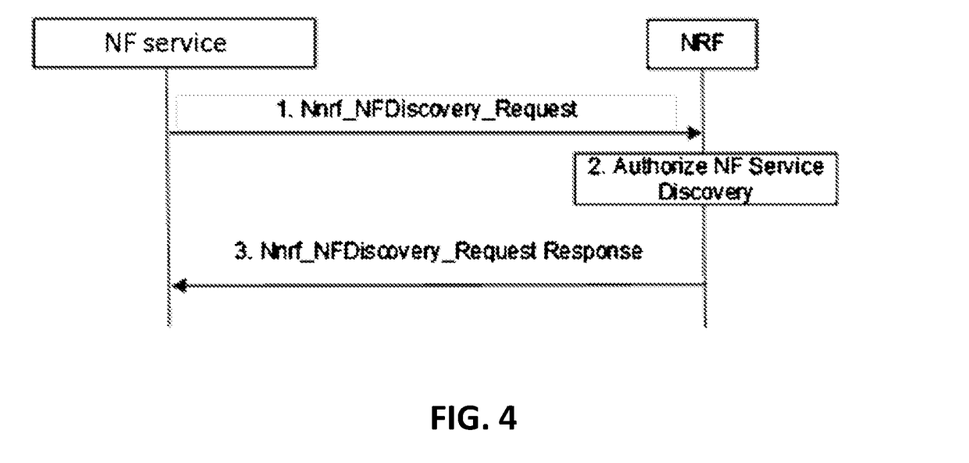
FIG. 4 is an illustration of an example of communications between a NF service and NRF during a service discovery process.

FIG. 4 shows an example of communications between a NF service (NF consumer) and the NRF during a service discovery process. In Step 1, the service consumer (NF service) tries to discover the available instances of a particular service in the network. The service consumer sends a discovery request to the NRF indicating:
NF Service Name
NF Type of the expected NF instance
NF type of the NF consumer
Optionally it may indicate the S-NSSAI.

In step 2, the NRF searches the registered services for those that match the criteria in the discovery request. In Step 3, the NRF replies to the NF with a set of discovered NF instance(s) or NF service instance(s) (for example, these may indicate a FQDN or IP address for each service in the set) that include one, some or all of the services that match the criteria.

Figure 5:
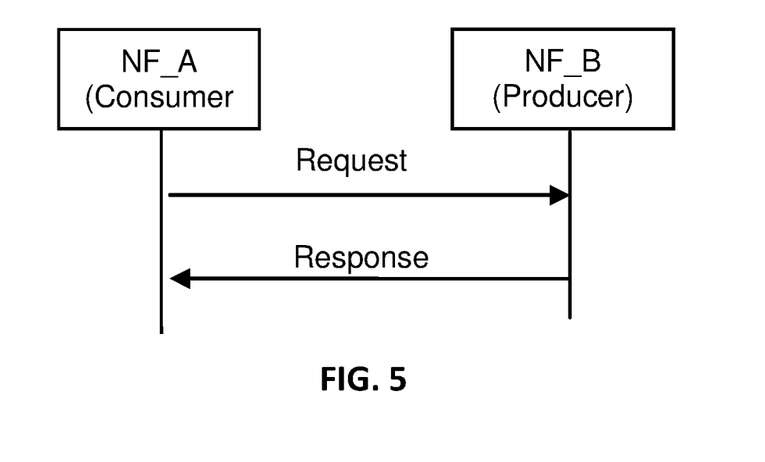
FIG. 5 is an illustration of an example of communications between a NF consumer and NF producer.

FIG. 5 shows an example of communications between a NF consumer and NF producer (e.g. service provider). The interaction between two Network Functions (Consumer and Producer) within this NF service framework follows two mechanisms.

In the first, "Request-response," a Control Plane NF_B (NF Service Producer) is requested by another Control Plane NF_A (NF Service Consumer) to provide a certain NF service, which either performs an action or provides information or both. NF_B provides a NF service based on the request by NF_A. In order to fulfil the request, NF_B may in turn consume NF services from other NFs. In the Request-response mechanism, communication is one to one between two NFs (consumer and producer) and a one-time response from producer to a request from consumer is expected within a certain timeframe.

In the second, "Subscribe-Notify," a Control Plane NF_A (NF Service Consumer) subscribes to NF Service offered by another Control Plane NF_B (NF Service Producer). Multiple Control Plane NFs may subscribe to the same Control Plane NF Service. NF_B notifies the results of this NF service to the interested NF(s) that subscribed to this NF service. The subscription request shall include the notification endpoint (e.g. the notification URL) of the NF Service Consumer to which the event notification from the NF Service Producer should be sent to. In addition, the subscription request may include notification request for periodic updates or notification triggered through certain events (e.g., the information requested gets changed, reaches certain threshold etc.).

A Control Plane NF_A may also subscribe to NF Service offered by Control Plane NF_B on behalf of Control Plane NF_C, i.e. it requests the NF Service Producer to send the event notification to another consumer(s). In this case, NF_A includes the notification endpoint of the NF_C in the subscription request.

SUMMARY

According to an aspect of this disclosure, there is provided a method for service registration in a communications network. The method comprises receiving a service registration request, the request identifying a network function to provide a service, a type of the service, and data administered by the service provided by the network function. The method also comprises storing information in a repository, the information identifying the network function, the type of the service and the data administered by the service provided by the network function.

According to another aspect of this disclosure, there is provided a method for service registration in a communications network. The method comprises sending a service registration request to a service registration network function, the request identifying a service providing network function to provide a service, a type of the service, and data administered by the service provided by the service providing network function.

According to a further aspect of this disclosure, there is provided a method for service discovery in a communications network. The method comprises, in response to a service discovery request to a service registration network function, the service discovery request identifying a type of service, receiving a service discovery response, the response identifying a service providing network function that provides the service and identifying data administered by the service provided by the service providing network function.

According to a still further aspect of this disclosure, there is provided a computer program comprising instructions which, when executed on at least one processor, cause the at least one processor to carry out a method according to any of the above aspects. Another aspect comprises a carrier that contains the computer program, wherein the carrier comprises one of an electronic signal, optical signal, radio signal or computer readable storage medium. Another aspect comprises a computer program product comprising non transitory computer readable media having stored thereon the computer program.

A further aspect of the present disclosure provides apparatus for service registration in a communications network. The apparatus comprises a receiving module configured to receive a service registration request, the request identifying a network function to provide a service, a type of the service, and data administered by the service provided by the network function. The apparatus also comprises a storing module configured to store information in a repository, the information identifying the network function, the type of the service and the data administered by the service provided by the network function.

A still further aspect of this disclosure provides apparatus for service registration in a communications network. The apparatus comprises a sending module configured to send a service registration request to a service registration network function, the request identifying a service providing network function to provide a service, a type of the service, and data administered by the service provided by the service providing network function.

A yet further aspect of this disclosure provides apparatus for service discovery in a communications network. The apparatus comprises a receiving module configured to, in response to a service discovery request to a service registration network function, the service discovery request identifying a type of service, receive a service discovery response, the response identifying a service providing network function that provides the service and identifying data administered by the service provided by the service providing network function.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC(s)) and/or field programmable gate array(s) (FPGA(s)), and (where appropriate) state machines capable of performing such functions.

According to some embodiments of this disclosure, the UDR is not a unique entity in a network. For example, there may be multiple UDRs in a network in the following cases:

In customers' deployments, there may be multiple UDRs deployed in the same network, for example, in China where multiple regions are deployed.

Multiple UDRs to hold different data respectively.

Multiple UDRs to provide different services to different service consumers (e.g. PCF, UDM, NEF and/or other consumer(s)).

In these cases, each UDR in a network may register the UDM service in the NRF, but each UDM only serves some specific data, for example subscription data for just a part of all subscribers could be held by a first UDR, while a second UDR may hold the rest of subscribers; or the first UDR could store subscription data just for UDM-FE and PCF, while the second UDR stores Application Data and even a third UDR stores Data for Exposure.

This means that each UDR may register a producer service under the same name (for example, "Unified Data Management"), but it is not possible to identify which data is accessed/served by that instance of the service. As a result, the consumer NF, e.g. UDM-FE, cannot obtain from discovery with the NRF the information to be able to select the UDR service instance that provides access to the data this consumer service is interested in.

The same problem applies to UDM when it stores locally the data (i.e. UDR as an external database is not deployed). If, for example, a UDM stores data for a group or range of subscribers, then UDM consumers (e.g. AMF, SMF, SMSF) do not know which UDM-FE instance stores data for the corresponding UE/subscriber.

In addition, at present it is not specified how service versions are handled, how vendor proprietary service functionality is handled, how vendor proprietary database (for storing any data in the 5G system) functionality is handled, or how service upgrades are handled.

Figure 6:
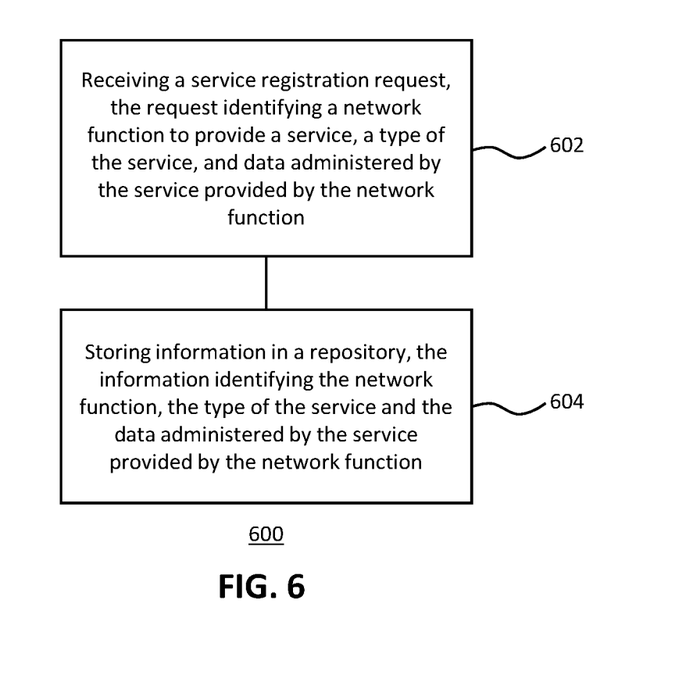
FIG. 6 is a flow chart of an example of a method for service registration in a communications network.

FIG. 6 is a flow chart of an example of a method 600 for service registration in a communications network. The method comprises, in block 602, receiving a service registration request, the request identifying a network function to provide a service, a type of the service, and data administered by the service provided by the network function. In block 604, the method 600 comprises storing information in a repository, the information identifying the network function, the type of the service and the data administered by the service provided by the network function.

For example, the data administered by the service may be the particular data (e.g. the group or range of data) that the service is associated with. For example, the particular data may be data stored by or for the service, or data created, amended, deleted, moved, provided, processed or managed by or for the service or any other operation performed on that data by or for that service.

In some embodiments, the service registration request is received from the network function. The information may be stored in a Network Repository Function (NRF). For example, the information that is stored may be a NF service profile. In some embodiments, the method is performed by a Network Repository Function (NRF).

In some embodiments, the method comprises receiving a service discovery request, the service discovery request identifying the type of service, and sending a service discovery response to a sender of the service discovery request, the service discovery response identifying the network function and/or the service. In some embodiments, the service discovery response identifies the data. Therefore, the sender of the service discovery request (e.g. NF service consumer) may determine whether the service(s) identified in the service discovery response are associated with the appropriate data, e.g. the group, range, etc. of data that the sender is interested in.

In some embodiments, the method comprises receiving a further service registration request, the further service registration request identifying a further network function to provide the service, the type of the service, and further data administered by the service provided by the further network function, and storing further information in a repository, the further information identifying the further network function, the type of the service and the further data administered by the service provided by the further network function. Therefore, for example, multiple services of the same type (e.g. with the same service name) may be registered, and they can be distinguished by the data that they are associated with (e.g. the group, range etc. of data). Therefore, for example, this may enable a service consumer to discover services that are associated with the correct data, and may discount those services that are not associated with the correct data (e.g. subscribers that the service consumer is not interested in). The method may also comprise receiving a service discovery request, the service discovery request identifying the type of service, and sending a service discovery response to a sender of the service discovery request, the service discovery response identifying at least one of the network function and the further network function. In some embodiments, the service discovery request identifies the data, and the service discovery response may exclude information identifying at least one network function that provides the service for different data. Therefore, for example, the service discovery response may identify only one or more services that are associated with data that the sender of the request is interested in. The further service registration request may be received from the further network function.

In some embodiments, the information identifying the data administered by the service provided by the network function comprises information identifying a subset of data, a category of data, a group of subscribers associated with the data, one or more applications that use the data, and/or a range of data administered by the service provided by the network function. Additionally or alternatively, the network function is a Unified Data Repository (UDR), User Data Repository (UDR), Unified Data Management (UDM), Policy Control Function (PCF), UDSF (Unstructured Data Storage Function), PDFD-FE (Packet Data Filter Description-Front-End) or Network Exposure Function (NEF). The data administered by the service provided by the network function may in some examples comprise data stored by or for the service or by the network function. The communications network may be, for example, a 5G system.

Figure 7:
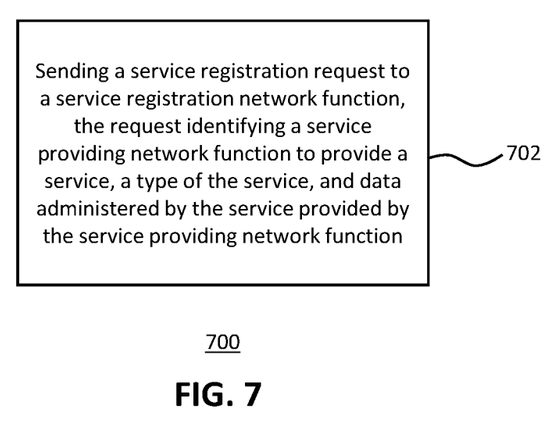
FIG. 7 is a flow chart of an example of a method for service registration in a communications network.

FIG. 7 shows an example of a method 700 for service registration in a communications network. The method 700 comprises, in block 702, sending a service registration request to a service registration network function, the request identifying a service providing network function to provide a service, a type of the service, and data administered by the service provided by the service providing network function. Therefore, for example, a sender of a request, such as a NF service producer, may register services that are associated with data in which the service is interested in, e.g. the type, group, range etc. of data.

In some examples, the service registration network function is a Network Repository Function (NRF). The service registration request may sent by the service providing network function, e.g. a NF service producer.

The data administered by the service provided by the service providing network function may be for example data stored by the service providing network function. The service providing network function may in some examples be a Unified Data Repository (UDR), User Data Repository (UDR), Unified Data Management (UDM), Policy Control Function (PCF), UDSF (Unstructured Data Storage Function), PDFD-FE (Packet Data Filter Description-Front-End) or Network Exposure Function (NEF).

The request may identify the data administered by the service provided by the service providing network function by identifying a subset of data, a category of data, a group of subscribers associated with the data, and/or a range of data administered by the service provided by the service providing network function.

Figure 8:
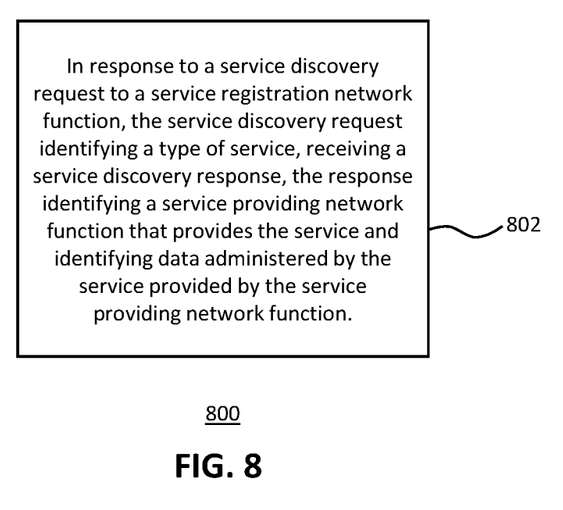
FIG. 8 is a flow chart of an example of a method for service discovery in a communications network.

FIG. 8 is a flow chart of an example of a method 800 for service discovery in a communications network. The method 800 comprises, in response to a service discovery request to a service registration network function, the service discovery request identifying a type of service, receiving a service discovery response, the response identifying a service providing network function that provides the service and identifying data administered by the service provided by the service providing network function. Therefore, in some examples, the sender of the service discovery request, e.g. a NF service consumer, may receive a response identifying service(s) and the sender may be able to select one or more services that are associated with the data in which the sender is interested in, e.g. the appropriate type, group, range etc of data. In some embodiments, the method 800 includes sending the service discovery request to the service registration network function (e.g. NRF).

In some examples, the service discovery response identifies a further network function that provides the service and identifies further data administered by the service provided by the further network function. Therefore, the response may identify multiple services, and potentially different data, if the further data is not the same or not completely the same (e.g. same range, etc) as the data for the first service.

The service discovery request may identify the data. In such cases, for example, the response may identify only those services that match the data, i.e., are associated with the same range, group, type etc. of data. The service discovery response may also identify a further network function that provides the service and identifies the data. That is, for example, the response identifies multiple services of the same type (e.g. same name) and associate with the same or similar data. The data administered by the service provided by the service providing network function and the data administered by the service provided by the further network function may comprise the same subset of data, category of data, group of subscribers associated with the data, and/or range of data.

In some embodiments the request identifies the data administered by the service provided by the service providing network function by identifying a subset of data, a category of data, a group of subscribers associated with the data, and/or a range of data administered by the service provided by the service providing network function. The service providing network function may in some examples be a Unified Data Repository (UDR), User Data Repository (UDR), Unified Data Management (UDM), Policy Control Function (PCF), UDSF (Unstructured Data Storage Function), PDFD-FE (Packet Data Filter Description-Front-End) or Network Exposure Function (NEF). The service registration network function in some examples comprises a Network Repository Function (NRF).

Figure 9:
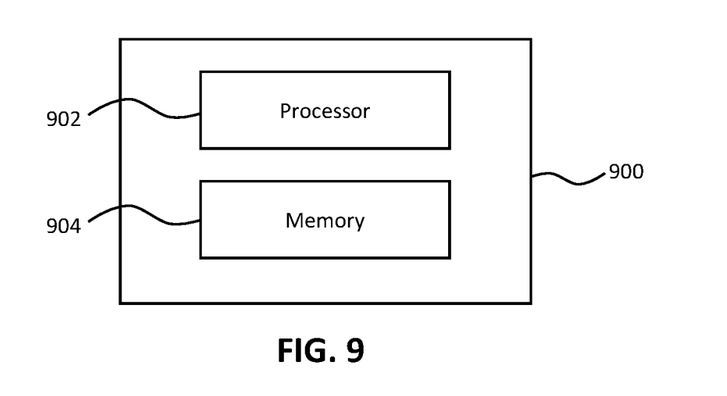
FIG. 9 is a schematic illustration of an example of apparatus for service registration in a communications network.

FIG. 9 is a schematic illustration of an example of apparatus 900 for service registration in a communications network. The apparatus 900 comprises a processor 902 and a memory 904. The memory 904 contains instructions executable by the processor 902 such that the apparatus 900 is operable to perform, for example, the method 600 shown in FIG. 6.

Figure 10:
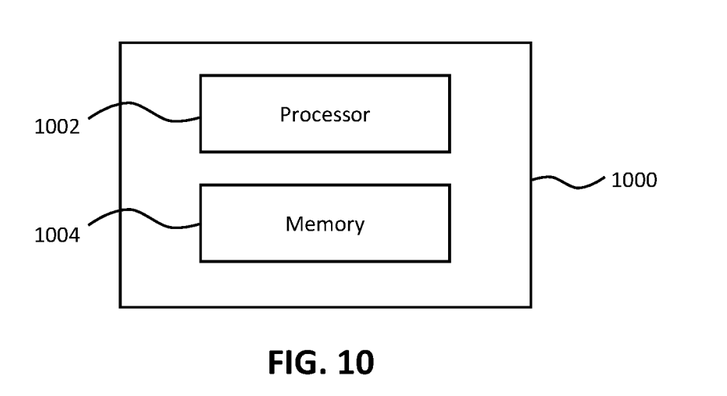
FIG. 10 is a schematic illustration of an example of apparatus for service registration in a communications network.

FIG. 10 is a schematic illustration of an example of apparatus 1000 for service registration in a communications network. The apparatus 1000 comprises a processor 1002 and a memory 1004. The memory 1004 contains instructions executable by the processor 1002 such that the apparatus 1000 is operable to perform, for example, the method 700 of FIG. 7.

Figure 11:
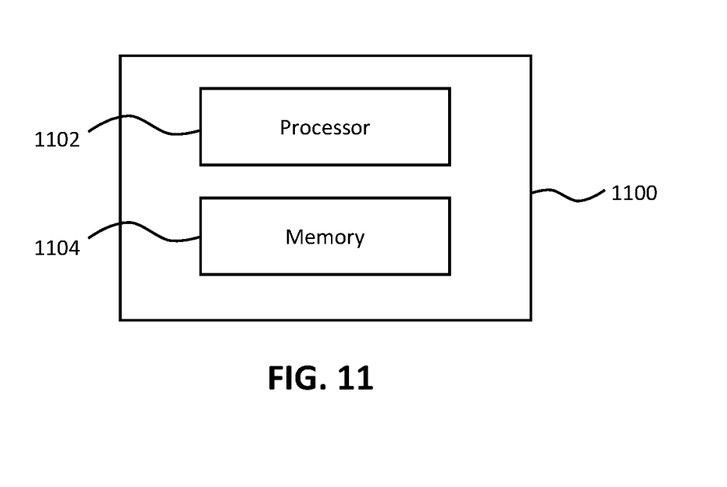
FIG. 11 is a schematic illustration of an example of apparatus for service discovery in a communications network.

FIG. 11 is a schematic illustration of an example of apparatus 1100 for service discovery in a communications network. The apparatus 1100 comprises a processor 1102 and a memory 1104. The 1104 memory contains instructions executable by the processor 1102 such that the apparatus 1100 is operable to perform, for example, the method 800 of FIG. 8.

Figure 12:
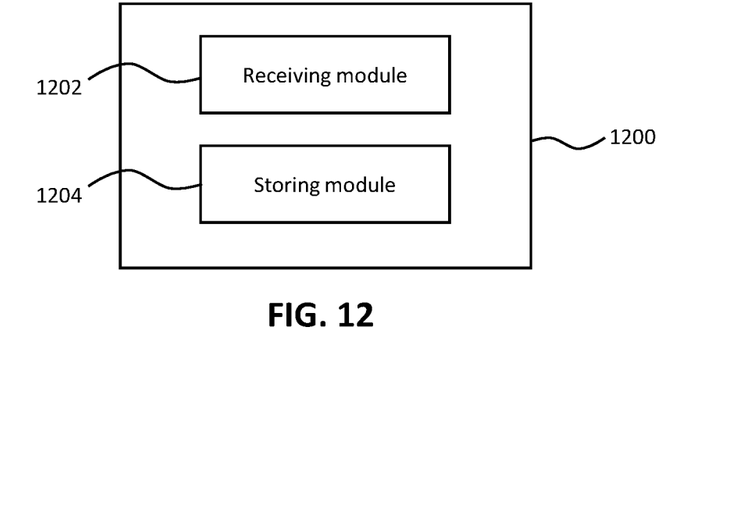
FIG. 12 is a schematic illustration of an example of apparatus for service registration in a communications network.

FIG. 12 is a schematic illustration of an example of apparatus 1200 for service registration in a communications network. The apparatus 1200 comprises a receiving module 1202 configured to receive a service registration request, the request identifying a network function to provide a service, a type of the service, and data administered by the service provided by the network function; and a storing module 1204 configured to store information in a repository, the information identifying the network function, the type of the service and the data administered by the service provided by the network function.

Figure 13:
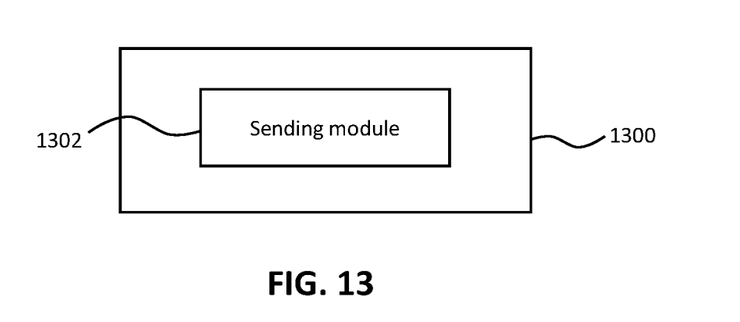
FIG. 13 is a schematic illustration of an example of apparatus for service registration in a communications network.

FIG. 13 is a schematic illustration of an example of apparatus 1300 for service registration in a communications network. The apparatus 1300 comprises a sending module 1302 configured to send a service registration request to a service registration network function, the request identifying a service providing network function to provide a service, a type of the service, and data administered by the service provided by the service providing network function.

Figure 14:
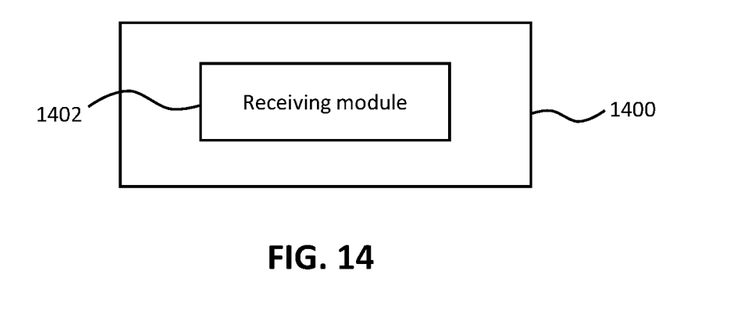
FIG. 14 is a schematic illustration of an example of apparatus for service discovery in a communications network.

FIG. 14 is a schematic illustration of an example of apparatus 1400 for service discovery in a communications network. The apparatus 1400 comprises a receiving module 1402 configured to, in response to a service discovery request to a service registration network function, the service discovery request identifying a type of service, receive a service discovery response, the response identifying a service providing network function that provides the service and identifying data administered by the service provided by the service providing network function.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

Some further examples and embodiments will now be described. Embodiments as disclosed herein propose a solution to support 5G SBA (service based architecture) service registration, discovery and execution towards a NF that stores data locally (e.g. a UDR that stores data locally). This solution can be implemented when data to be accessible by a UE/consumer (as example UDM-FE) is stored in more than one NF (e.g. multiple UDRs are deployed), then the UE/consumers need to know which one of the multiple NFs storing data stores data it is interested in, when the service provided by the multiple producer NFs (e.g. UDR) is the same.

Embodiments disclosed herein propose to update service registration to allow the producer to identify the data accessible by the service, either by explicit information at registration or by complementing this information with configuration in the producer.

In some embodiments, service discovery is modified to provide the consumer with that information that is registered as part of the service information.

Service execution by the consumer is in some embodiments modified in a way that the consumer can identify which service producer should be used for each request for a service, based on the data that needs to be accessed, i.e. selecting the service that provides access to the data that the service consumer is interested in. For example, at registration of a UE in an AMF for mobility, the AMF requires this UE subscription data to UDM-FE, that needs to fetch this data from the corresponding UDR (e.g. the correct UDR if multiple are deployed) via the same service (e.g. Nudr Unified Data Management service).

Figure 15:
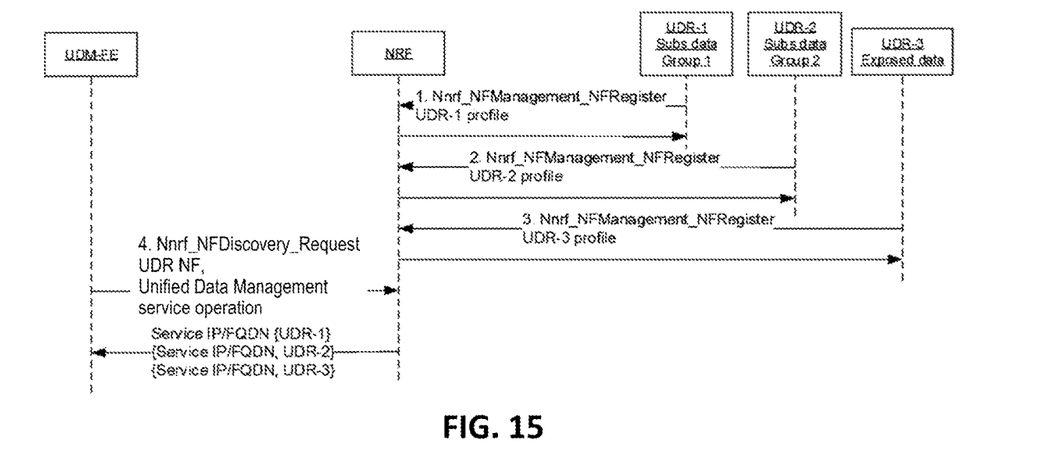
FIG. 15 shows an example of communications between certain entities in a communications network during a service registration and discovery process.

FIG. 15 shows an example of communications between certain entities in a communications network during a service registration and discovery process. Registration is performed in steps 1-3, and discovery request in step 4. Steps 1-3 may be performed in any order. In steps 1-3, each UDR (UDR-1, UDR-2 and UDR-3) registers its NF profile (service profile) with the NRF. The NF profile may include:

NF instance ID
NF type
PLMN ID
Network Slice related Identifier(s) e.g. S-NSSAI, NSI ID
FQDN or IP address of NF
NF capacity information
NF Specific Service authorization information
Name(s) of supported service(s)
Endpoint information of instance(s) of each supported service; and/or
Other service parameter, e.g., DNN, notification endpoint for each type of notification that the NF service is interested in receiving.

Some embodiments as disclosed herein allow (for example) multiple UDR NFs to provide some manner to identify the data associated with each NF, in way the consumer can select which one to use. Multiple options are possible, including for example the following:

Different UDRs may use a different "NF instance" (e.g. "UDR-1", "UDR-2", "UDR-3"). Then, the consumer could be configured to identify the corresponding data that is accessible by each service. E.g.

"UDR-1": subs data group 1 (list and/or ranges of subscriber identities).
"UDR-2": subs data group 2 (list and/or ranges of subscriber identities).
"UDR-3": data for exposure.

Additionally or alternatively, "Other service parameter" could be extended to include a new parameter that identifies different data sets (e.g. different types of data, or just part of the same data type identified by a range/group of data identifiers—like range of subscriber identities).

In an example disclosed herein, UDM-FE may wish to discover UDR services. This may comprise the UDM-FE indicating the service name to be discovered. Then, the discovery (e.g. discovery response) may provide enough information for the UDM-FE to be able to select the appropriate UDR instance. The information provided may be enough to uniquely identify data to be accessed in each UDR instance, like e.g. new parameter indicates "data for exposure", this provides all information required by consumer to select the appropriate UDR instance.

Figure 16:
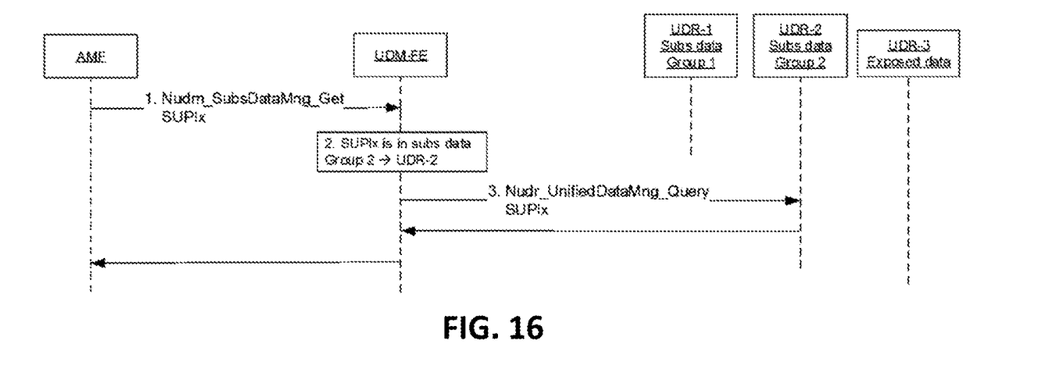
FIG. 16 shows communications between entities in a communications network during use of a service.

FIG. 16 shows communications between entities in a communications network during an example use case of use of a UDM-FE service by AMF. We can consider for example when AMF needs to get access to particular UE subscriber data. It requests that information from UDM-FE, using for example Nudm_SubsDataMng_Get operation, for one specific UE identify (e.g. SUPIx). The UDM-FE needs to identify which Nudr service it needs to use to access corresponding data. It needs to check information at registration, e.g. contained within a service discovery response, and in some examples also some local configuration may be required. In one example, we consider SUPIx is within Subscriber Data Group 2, i.e. stored by UDR-2; UDM-FE executes Nudr service that is registered by UDR-2 (i.e. using provided IP address or FQDN).

In another example, an AMF needs to identify which UDM instance stores data for corresponding UE. In a 5G System, Diameter routing is not available since SBA interfaces are based on service registration and discovery, and in (e.g.) HTTP/REST APIs. Therefore, embodiments disclosed herein allow each UDM instance to register its services, but provide information to identify which subscription data is stored in or for each instance.

It should be noted that the above-mentioned examples illustrate rather than limit the embodiments disclosed herein, and that those skilled in the art will be able to design many alternative examples. The word "comprising" does not exclude the presence of additional elements or steps, "a" or "an" does not exclude a plurality, and a single processor or other unit may fulfil the functions of several units. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in statements shall not be construed so as to limit their scope.

The invention claimed is:

1. A method for service discovery in a communications network, the method comprising:
in response to a service discovery request to a service registration network function, the service discovery request identifying a type of service, receiving a service discovery response, the service discovery response identifying:
a service providing network function that provides the service;
data administered by the service provided by the service providing network function;
a further service providing network function that provides the service;
further data administered by the service provided by the further service providing network function; and
the data administered by the service provided by the service providing network function and the further data administered by the service provided by the further service providing network function having at least the same range of data.

2. The method of claim 1, wherein the service discovery response further identifies the data administered by the service provided by the service providing network function by further identifying at least one of a subset of data, a category of data, a group of subscribers associated with the data, and a range of data administered by the service provided by the service providing network function.

3. The method of claim 1, wherein the service providing network function is one of a Unified Data Repository (UDR), User Data Repository (UDR), Unified Data Management (UDM), Policy Control Function (PCF), UDSF (Unstructured Data Storage Function), PDFD-FE (Packet Data Filter Description-Front-End) and Network Exposure Function (NEF).

4. The method of claim 1, wherein the service registration network function comprises a Network Repository Function (NRF).

5. The method of claim 1, further comprising sending the service discovery request to the service registration network function.

6. The method of claim 1, wherein the service discovery request identifies the data that is requested.

7. The method of claim 6, further comprising selecting the service that is associated with the data identified in the service discovery request.

8. The method of claim 1, further comprising selecting one of the service provided by the providing network function and the service provided by the further network function based on the respective data administered.

9. The method of claim 1, wherein the service discovery response further identifies the further data administered by the service provided by the further network function by further identifying at least one of a subset of the further data, a category of the further data, a group of subscribers associated with the further data, and a range of the further data administered by the service provided by the further network function.

10. An apparatus for service discovery in a communications network, the apparatus comprising a processor and a memory, the memory containing instructions executable by the processor such that the apparatus is configured to:
   receive, in response to a service discovery request to a service registration network function, the service discovery request identifying a type of service, a service discovery response, the service discovery response identifying:
      a service providing network function that provides the service;
      data administered by the service provided by the service providing network function;
      a further service providing network function that provides the service;
      further data administered by the service provided by the further service providing network function; and
      the data administered by the service provided by the service providing network function and the further data administered by the service provided by the further service providing network function having at least the same range of data.

11. The apparatus of claim 10, wherein the service discovery response further identifies the data administered by the service provided by the service providing network function by identifying at least one of a subset of data, a category of data, a group of subscribers associated with the data, and a range of data administered by the service provided by the service providing network function.

12. The apparatus of claim 10, wherein the service providing network function is one of a Unified Data Repository (UDR), User Data Repository (UDR), Unified Data Management (UDM), Policy Control Function (PCF), UDSF (Unstructured Data Storage Function), PDFD-FE (Packet Data Filter Description-Front-End) and Network Exposure Function (NEF).

13. The apparatus of claim 10, wherein the service registration network function comprises a Network Repository Function (NRF).

14. The apparatus of claim 10, wherein the memory contains further instructions executable by the processor such that the apparatus is further configured to:
   send the service discovery request to the service registration network function.

15. The apparatus of claim 10, wherein the service discovery request identifies the data that is requested.

16. The apparatus of claim 15, wherein the memory contains further instructions executable by the processor such that the apparatus is further configured to:
   select the service that is associated with the data identified in the service discovery request.

17. The apparatus of claim 10, wherein the memory contains further instructions executable by the processor such that the apparatus is further configured to:
   select one of the service provided by the providing network function and the service provided by the further network function based on the respective data administered.

18. The apparatus of claim 10, wherein the service discovery response further identifies the further data administered by the service provided by the further network function by further identifying at least one of a subset of the further data, a category of the further data, a group of subscribers associated with the further data, and a range of the further data administered by the service provided by the further network function.

\* \* \* \* \*

UNITED STATES PATENT AND TRADEMARK OFFICE
CERTIFICATE OF CORRECTION

Page 1 of 2

PATENT NO. : 11,832,169 B2
APPLICATION NO. : 17/407582
DATED : November 28, 2023
INVENTOR(S) : Bartolomé Rodrigo et al.

It is certified that error appears in the above-identified patent and that said Letters Patent is hereby corrected as shown below:

On the Title Page

On Page 2, in Item (56), under "OTHER PUBLICATIONS", in Column 1, Line 9, delete "Ct" and insert -- CT --, therefor.

On Page 2, in Item (56), under "OTHER PUBLICATIONS", in Column 2, Line 2, delete "Aspects;System" and insert -- Aspects; System --, therefor.

On Page 2, in Item (56), under "OTHER PUBLICATIONS", in Column 2, Line 3, delete "System;Stage" and insert -- System; Stage --, therefor.

On Page 2, in Item (56), under "OTHER PUBLICATIONS", in Column 2, Line 9, delete "3Gpp" and insert -- 3GPP --, therefor.

In the Drawings

In Fig. 5, Sheet 3 of 7, delete "(Consumer" and insert -- (Consumer) --, therefor.

In Fig. 8, Sheet 4 of 7, Tag "802", Line 10, delete "function." and insert -- function --, therefor.

In Fig. 15, Sheet 7 of 7, and on the title page, the illustrative print figure, delete "Service" and insert -- (Service --, therefor.

In the Specification

In Column 1, Line 8, delete "2020," and insert -- 2020, now Pat. No. 11,109,307, --, therefor.

In Column 4, Line 15, delete "sent to." and insert -- sent. --, therefor.

In Column 6, Line 22, delete "not obscure" and insert -- not to obscure --, therefor.

Signed and Sealed this
Fifth Day of March, 2024

Katherine Kelly Vidal
*Director of the United States Patent and Trademark Office*

CERTIFICATE OF CORRECTION (continued)
U.S. Pat. No. 11,832,169 B2

In Column 7, Lines 3-4, delete "stores locally the data" and insert -- stores the data locally --, therefor.

In Column 9, Line 5, delete "range etc" and insert -- range, etc. --, therefor.

In Column 9, Line 15, delete "etc)" and insert -- etc.) --, therefor.

In Column 12, Line 3, delete "identify" and insert -- identifier --, therefor.